United States Patent
Muramatsu

(10) Patent No.: US 6,749,051 B2
(45) Date of Patent: Jun. 15, 2004

(54) RATCHET ONE-WAY CLUTCH AND STATOR USING RATCHET ONE-WAY CLUTCH

(75) Inventor: Kazuhiko Muramatsu, Fukuroi (JP)

(73) Assignee: NSK-Warner K. K., Tokyo (JP)

( * ) Notice: Subject to any disclaimer, the term of this patent is extended or adjusted under 35 U.S.C. 154(b) by 0 days.

(21) Appl. No.: 10/195,532

(22) Filed: Jul. 16, 2002

(65) Prior Publication Data

US 2003/0015391 A1 Jan. 23, 2003

(30) Foreign Application Priority Data

Jul. 17, 2001 (JP) ........................................ 2001-216690

(51) Int. Cl.[7] .............................................. F16H 41/24
(52) U.S. Cl. .......................................... 192/46; 60/345
(58) Field of Search ..................... 192/46, 45.1, 3.34, 192/39, 43.1, 71; 60/345

(56) References Cited

U.S. PATENT DOCUMENTS

| | | | | |
|---|---|---|---|---|
| 1,883,966 A | * | 10/1932 | Krause | 192/46 |
| 2,818,950 A | * | 1/1958 | Harless | 192/46 |
| 4,187,728 A | * | 2/1980 | Mazzorana | 192/46 |
| 4,254,852 A | * | 3/1981 | Orozco | 192/46 |
| 4,441,315 A | * | 4/1984 | Bochot | 60/345 |
| 6,557,681 B2 | * | 5/2003 | Kinoshita et al. | 192/46 |
| 6,575,275 B2 | * | 6/2003 | Muramatsu et al. | 192/46 |

FOREIGN PATENT DOCUMENTS

GB        2 152 157 A    *  7/1985

* cited by examiner

*Primary Examiner*—Rodney H. Bonck
(74) *Attorney, Agent, or Firm*—Miles & Stockbridge P.C.

(57) ABSTRACT

The present invention provides a ratchet one-way clutch comprising inner and outer races disposed on a same axis and in which a pawl member as a torque transmitting member and a biasing member for biasing the pawl member are provided in one of the inner and outer races and a recessed portion into which the pawl member is fitted is provided in the other of the inner and outer races so that torque can be transmitted by engagement between the pawl member and the recessed portion and wherein a first pocket for housing the pawl member is provided in either the outer race or the inner race, and a supporting portion for supporting the pawl member in an axial direction is provided on an inner surface of the first pocket.

2 Claims, 4 Drawing Sheets

RATCHET ONE-WAY CLUTCH AND STATOR USING RATCHET ONE-WAY CLUTCH

BACKGROUND OF THE INVENTION

1. Field of the Invention

The present invention relates to a ratchet one-way clutch using ratchets (pawls) as a locking mechanism among one-way clutches used in a transmission for motor vehicles, farm machines, building machines, industrial machines and the like and having a back stop function, particularly a transmission for vehicles, and a stator for a torque converter using such a ratchet one-way clutch.

2. Related Background Art

In general, a one-way clutch used in an automatic transmission has outer and inner races which are rotated relative to each other, and sprags or rollers for transmitting torque between the outer race and the inner race are engaged by a track surface of the outer race or the inner race so that rotational torque is transmitted only in one direction. Further, the clutch is idly rotated in an opposite direction.

Among such one-way clutches, there is a ratchet one-way clutch in which a ratchet is used as a torque transmitting member for transmitting torque between the outer race and the inner race. The ratchet one-way clutch is constituted by an outer race provided at its inner periphery with pockets, an inner race disposed in coaxial with the outer race and provided at its outer periphery with notches, pawl members disposed within the pockets and adapted to be fitted into the notches of the inner race to establish a lock-up condition of the one-way clutch in which torque can be transmitted between the inner race and the outer race, and elastic members for biasing the pawl members towards the inner race.

In the ratchet one-way clutch having the above-mentioned arrangement, when the one-way clutch is rotated in one direction, since the pawl members are slid freely with respect to an outer periphery of the inner race, the outer race and the inner race are rotated idly relative to each other. If the one-way clutch tries to rotate in an opposite direction, the pawl members are fitted into the notches, thereby establishing the lock-up condition of the one-way clutch.

In recent years, development regarding compactness, light-weighting and cost reduction of parts of a motor vehicle such as a transmission has widely been effected, and the one-way clutch is also included in such interest. In order to meet such request, use of the ratchet one-way clutch has been proposed.

Generally, in the ratchet one-way clutch, the pawl members are contained in the pockets formed in the inner race or the outer race and are rocked around their gravity centers within the pockets. The pawls are engaged by recessed portions formed in the outer race or the inner race by such rocking movement, thereby transmitting the torque. Further, in order to facilitate the engagement between the pawl member and the recessed portion, each pawl member is biased toward the recessed portion by a biasing member.

Normally, since the pawl member within the pocket has relatively great clearances at both sides in an axial direction, the pawl may be shaken within the pocket after assembling or the assembling operation itself may become difficult. Further, due to the presence of such clearances, during the operation of the ratchet one-way clutch, movement of the pawl member may become unstable and thus the operation of the ratchet one-way clutch itself may become unstable. That is to say, the holding ability and operation reliability of the pawl member are not always satisfied.

Further, although the pawl member is biased by the biasing member, since a coil spring is normally used as the biasing member, positioning of the biasing member in a second pocket is apt to become unstable. Thus, there may be dispersion in an urging force against the pawl member, thereby affecting a bad influence upon the operation of the ratchet one-way clutch.

SUMMARY OF THE INVENTION

Accordingly, an object of the present invention is to provide a ratchet one-way clutch which can suppress shaking of parts and facilitate assembling and in which stability of an operating pawl can be achieved.

To achieve the above object, the present invention provides a ratchet one-way clutch comprising inner and outer races disposed on a same axis and in which a pawl member as a torque transmitting member and a biasing member for biasing the pawl member are provided in one of the inner and outer races and a recessed portion into which the pawl member is fitted is provided in the other of the inner and outer races so that torque can be transmitted by engagement between the pawl member and the recessed portion and wherein a first pocket for housing the pawl member is provided in either the outer race or the inner race, and a supporting portion for supporting the pawl member in an axial direction is provided on an inner surface of the first pocket.

In the present invention, since the first pocket for housing the pawl member is provided in either the outer race or the inner race and the supporting portion for supporting the pawl member in the axial direction is provided on the inner surface of the first pocket, operating stability of the pawl member can be achieved. Further, an assembling ability is enhanced and shaking of parts can be prevented.

Further, since there is provided a second pocket provided in wither the outer race or the inner race and communicated with the first pocket and adapted to contain a biasing means and the second pocket is provided with a stepped portion for positioning the biasing member, a biasing force against the pawl member becomes stable.

DETAILED DESCRIPTION OF THE PREFERRED EMBODIMENTS

Figure 1:
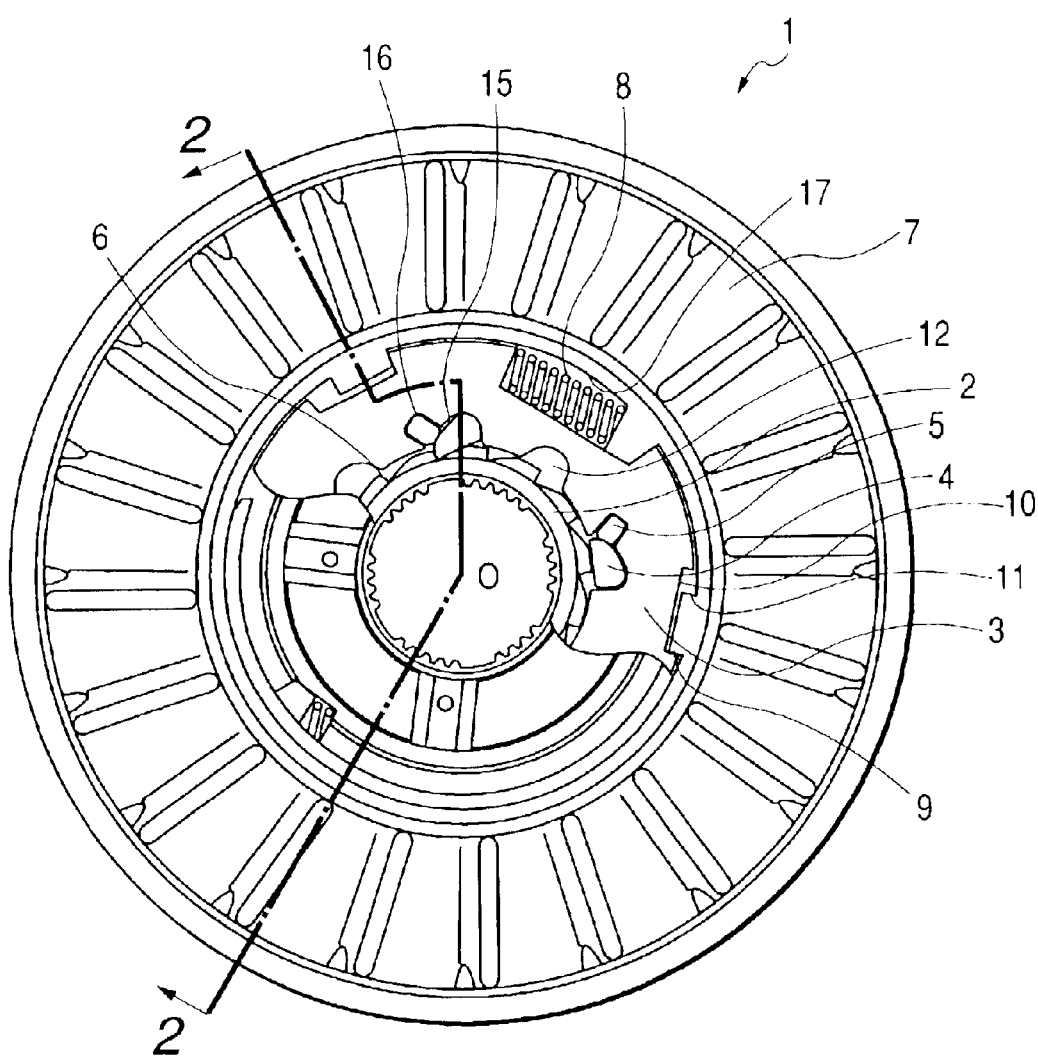
FIG. 1 is a front (partial sectional) view of a stator using a ratchet one-way clutch according to the present invention.

The present invention will now be fully explained in connection with embodiments thereof with reference to the accompanying drawings. Incidentally, in the drawings, the same elements are designated by the same reference numerals. Further, although the present invention is explained in connection with various embodiments, it should be noted that the present invention is not limited to such embodiments.

Figure 2:
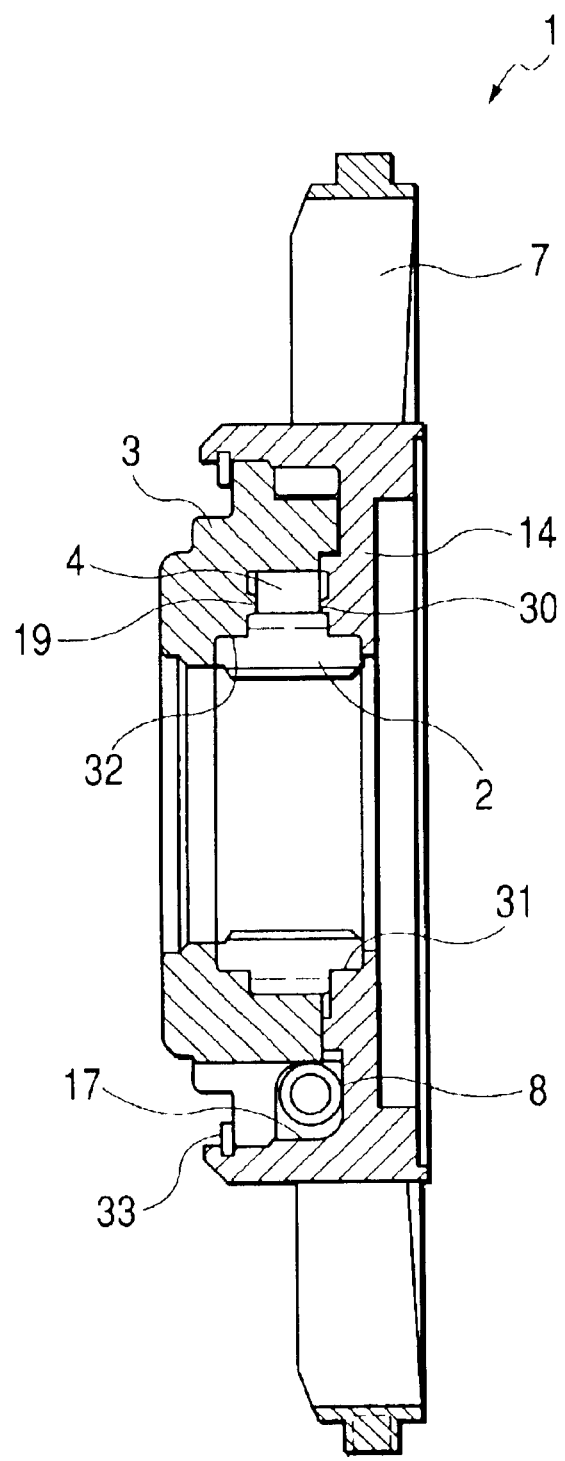
FIG. 2 is a sectional view taken along the line 2—2 in FIG. 1.

FIG. 1 is a front (partial sectional) view of a stator for a torque converter, using a ratchet one-way clutch according to the present invention, and FIG. 2 is a sectional view take along the line 2—2 in FIG. 1. A stator 1 comprises an outer race 3 disposed in an inner periphery of a vane wheel 7, and an inner race 2 disposed coaxial with the outer race 3. First pockets 15 and second pockets 16 are formed in an inner periphery of the outer race 3, and a ratchet, i.e., a pawl member 4 is disposed within each first pocket 15 and an accordion spring 5 for biasing the pawl member 4 obliquely in a radial direction is disposed in each second pocket 16. On the other hand, recessed portions 6 into which the pawl members 4 are fitted are formed in an outer periphery of the inner race 2.

An inner peripheral flange portion, i.e., inner peripheral portion 14 of the vane wheel 7 contacts with an outer periphery and side surfaces of the outer race 3 to act as a bush and a bearing and supports the pawl members 4 and the accordion springs 5 in an axial direction. Further, for example, damper springs 8 that are coil springs are disposed between the inner peripheral portion 14 and the outer race 3. Incidentally, the accordion spring may be other spring such as a coil spring.

Protruded portions 9 are formed on the inner peripheral portion 14 and recessed portions 10 are formed in the outer periphery of the outer race 3 so that the recessed portions 10 cover the corresponding protruded portions 9 via gaps 11 and the damper springs 8 urge the protruded portions 9 against the corresponding recessed portions 10 at one side. With this arrangement, when the pawl members 4 are engaged by the recessed portions 6 in the outer periphery of the inner race 2, shock is absorbed by the damper springs 8. Further, by limiting a compressed range of the damper spring 8 by the engagement between the protruded portion 9 and the recessed portion 10, yielding and/or damage of the damper spring 8 can be prevented.

The damper springs 8 are disposed within spring pockets 17 defined between the outer race 3 and the vane wheel 7 of the stator 1. Although a plurality of spring pockets 17 are provided along a circumferential direction, the number of such pockets can appropriately be selected.

Incidentally, recessed portions as stress dispersing means 12 are provided in the inner periphery of the outer race 3 of the stator 1. The stress dispersing means 12 has a substantially semi-circular radial section and is defined by curved surface. As shown in FIG. 2, each pawl member 4 is held in the axial direction by a projection 30 protruded from the inner peripheral portion 14 of the vane wheel 7 and a projection 19 protruded from the outer race 3 and can be rocked between the projections 30 and 19. A part of the inner peripheral portion 14 is provided with a bearing portion 31 as a bearing for the inner race 2, and a part of the outer race 3 is provided with a bearing portion 32 as a bearing for the inner race 2. Further, outer race 3 is fixed by a snap ring secured to the vane wheel 7 not to be shifted axially.

Figure 3:
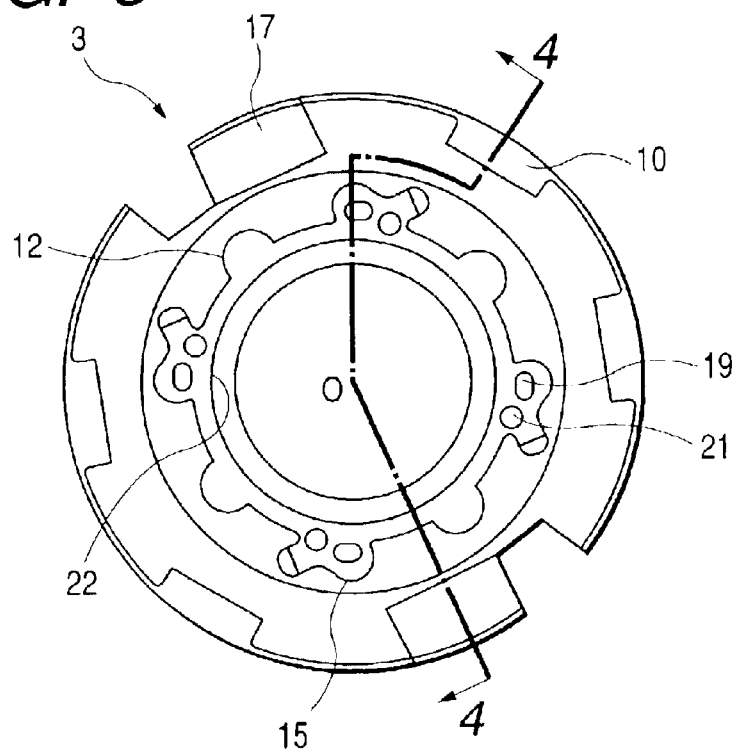
FIG. 3 is a front view of an outer race.
Figure 4:
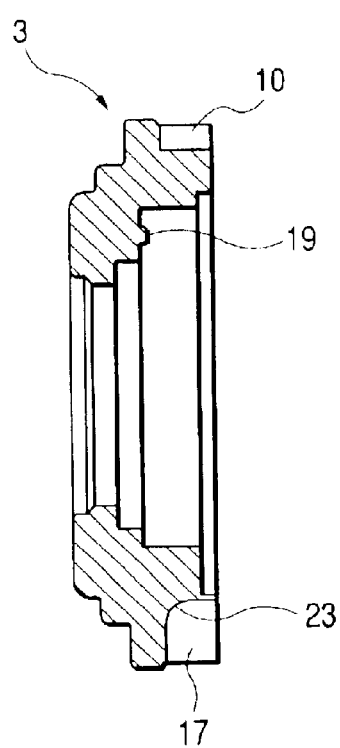
FIG. 4 is a sectional view taken along the line 4—4 in FIG. 3.

FIG. 3 is a front view of the outer race 3 of the ratchet one-way clutch and FIG. 4 is a sectional view taken along the line 4—4 in FIG. 3. Two diametrically opposed spring pockets 17 formed in the outer periphery of the outer race 3 to contain the damper springs 8 are provided. Further, two recessed portions 10 substantially equidistantly arranged along the circumferential direction are provided between the spring pockets 17.

The projection 19 protruded axially toward the pawl member 4 is formed on a side surface of the first pocket 15 of the outer race 3 for containing the pawl member 4.

Further, a lubricating oil supplying through-hole 21 is provided in the vicinity of the projection 19. Lubricating oil from the lubricating oil supplying hole 21 lubricates the interior of the ratchet one-way clutch and further lubricates the bearing portion 31 and the bearing portion 32.

As shown in FIG. 4, in order to define the spring pocket 17 for containing and holding the damper spring 8, at least a part of a corner portion 23 formed on the outer race 3 is formed as a curved surface having an arc-shaped radial section. In consideration of the holding function for the damper spring 8, the corner portion 23 is preferably defined by an arc-shaped curved surface extending wholly around the circumferential direction. In order to prevent local wear due to offset contact, a curvature of the curved surface preferably coincides with the radial curvature of the damper spring 8 as the coil spring.

Figure 5:
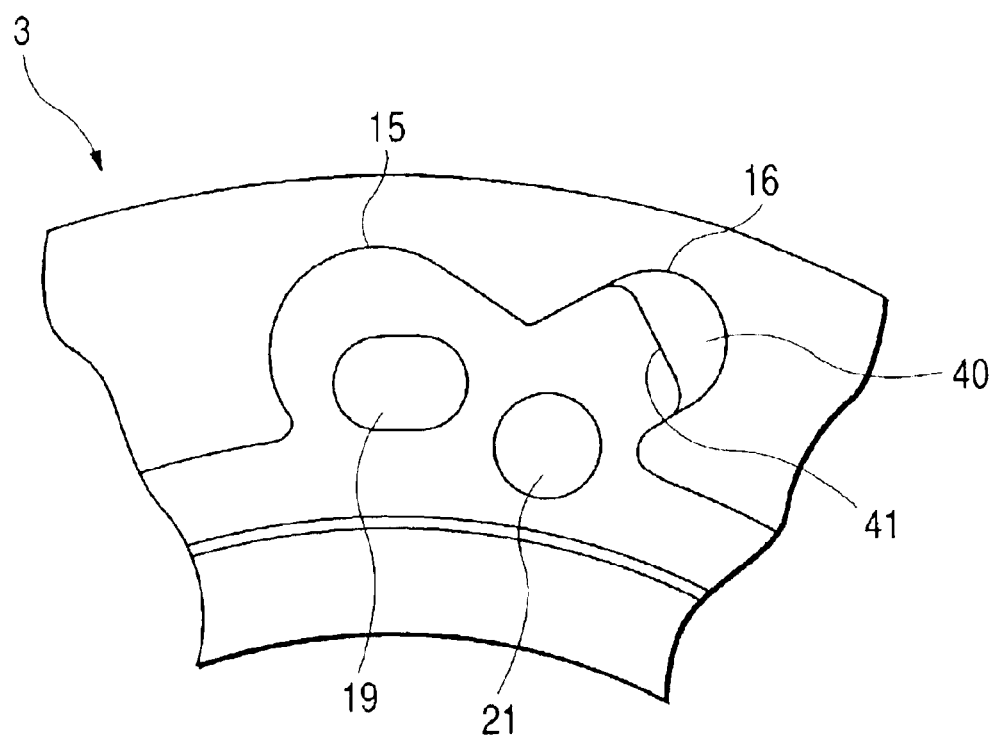
FIG. 5 is an enlarged partial front view showing first and second pockets of the outer race of FIG. 3 in detail.
Figure 6:
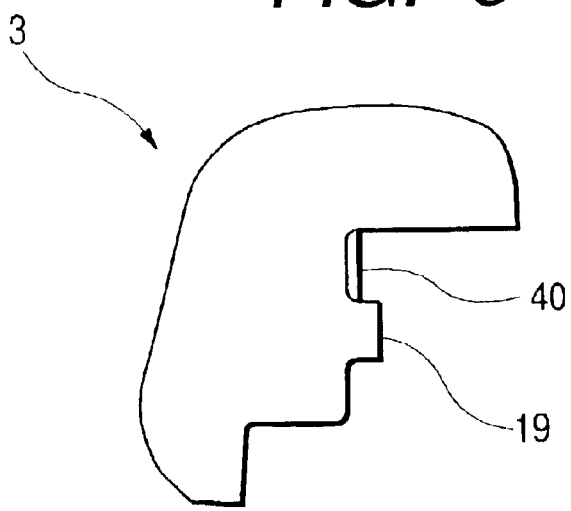
FIG. 6 is a partial enlarged view of the first pocket of FIG. 4 and therearound.

FIG. 5 is an enlarged partial front view shoving the first and second pockets of the outer race of FIG. 3 in detail, and FIG. 6 is a partial enlarged view of the first pocket of FIG. 4 and therearound. An opposing surface of the projection 19 extending axially inwardly from the wall of the first pocket 15 of the outer race 3, which surface is opposed to the side of the pawi member 4, is formed as a substantially elliptical shape having a long axis along the circumferential direction. Similarly, an opposing surface of the projection 30 of the vane wheel 7 explained in connection with FIG. 2 is preferably formed as a substantially elliptical shape. As a shape capable of accommodating the shift of the gravity position of the pawl member 4 during operation, an elliptical shape is effective.

Since the opposing surface of the projection 19 or 30 supports the side surface of the pawl member 4 in the axial direction and has the elliptical shape along the circumferential direction, the pawl member 4 can be supported effectively also in the circumferential direction. Further, a stepped portion 40 is provided at that side of the second pocket 16 for containing the spring 5 for biasing the pawl member 4. The stepped portion 40 has a substantially straight boundary surface 41. Since one end of the spring 5 (for example, a coil spring) is held on the boundary surface 41, one end of the spring 5 can positively be positioned to improve the seating of the spring, thereby preventing the spring from being shaken within the second pocket 16 to make the biasing force against the pawl member 4 unstable. Further, in the assembling and transporting, the parts can be prevented from being shaken.

FIG. 6 is a partial enlarged view of the first pocket of FIG. 4 and therearound and shows a condition that the projection 19 extends in the axial direction. A height of the stepped portion 40 in the axial direction is smaller than that of the projection 19.

It should be noted that the stepped portion 40 is formed complementary to an end shape of a spring when the spring 5 contained in the second pocket 16 is a spring other than the accordion spring.

In the above-mentioned embodiment of the present invention, the number of damper springs 8, spring pockets 17, 29 containing such damper springs and the number of protruded portions 9 and recessed portions 10 for limiting the rotation of the outer race 3 can be selected appropriately and are not limited to the illustrated numbers. Further, while an example that the recessed portions 6 which are engaged by the pawl members 4 are provided in the inner race 2 was explained, a reverse arrangement can be adopted. That is to say, the recessed portions may be provided in the outer race and the first and second pockets for containing the pawl portions may be provided in the inner race 2.

The above-mentioned ratchet one-way clutch and stator using such ratchet one-way clutch achieve the following effects.

Since the supporting portion for supporting the pawl member in the axial direction is provided in the inner surface of the first pocket containing the pawl member, the operating stability of the pawl member can be obtained. Further, the assembling ability is enhanced and the parts can be prevented from being shaken.

Further, since the supporting portion has the shape capable of accommodating the shift of the gravity position of the operating pawl member, the pawl member can be supported further stably.

In addition, since the shape of the supporting portion is elliptical, stable supporting of the pawl member becomes more positive.

Further, since there is provided the second pocket containing the biasing member and the second pocket is provided with the stepped portion for positioning the biasing member, the biasing force against the pawl member is stabilized.

What is claimed is:

1. A ratchet one-way clutch comprising:

inner and outer races disposed on a same axis, wherein a pawl member as a torque transmitting member and a biasing member biasing said pawl member are provided in one of said inner and outer races and a recessed portion into which said pawl member is fitted is provided in the other of said inner and outer races so that torque can be transmitted by engagement between said pawl member and said recessed portion; and wherein a first pocket housing said pawl member is provided in either said outer race or said inner race, and a supporting portion supporting said pawl member in an axial direction is provided on an inner surface of said first pocket, wherein a surface of said supporting portion opposed to said pawl member has an elliptical shape extending along a circumferential direction.

2. A stator using a ratchet one-way clutch according to claim 1.

* * * * *